July 3, 1956
C. A. HOLLINGSWORTH
2,753,045
CONCENTRATION OF MINERALS
Filed Nov. 25, 1953
3 Sheets-Sheet 1
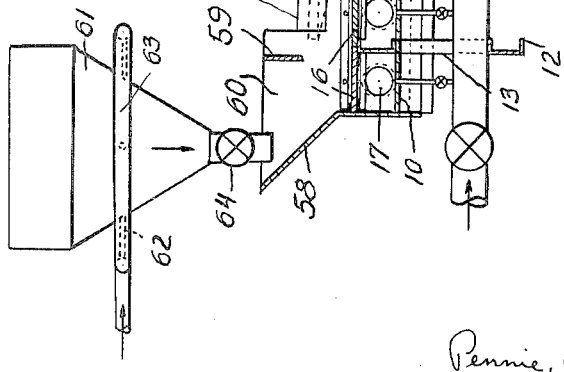
INVENTOR
CLINTON A. HOLLINGSWORTH
BY
Pennie, Edmonds, Morton, Barrows & Taylor
ATTORNEYS July 3, 1956
C. A. HOLLINGSWORTH
2,753,045
CONCENTRATION OF MINERALS
Filed Nov. 25, 1953
3 Sheets-Sheet 2
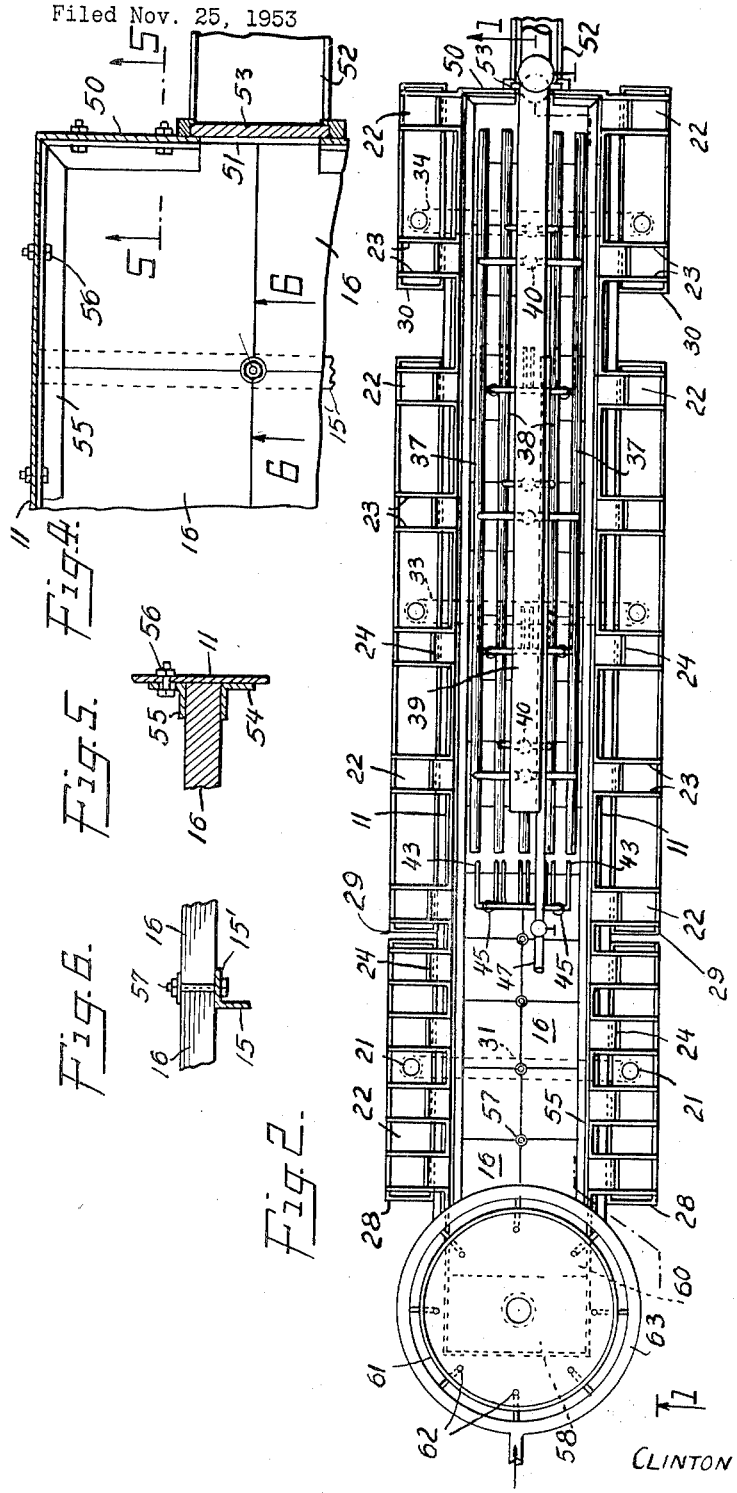
INVENTOR
CLINTON A. HOLLINGSWORTH
BY
Pennie, Edmonds, Morton, Barrows & Taylor
ATTORNEYS

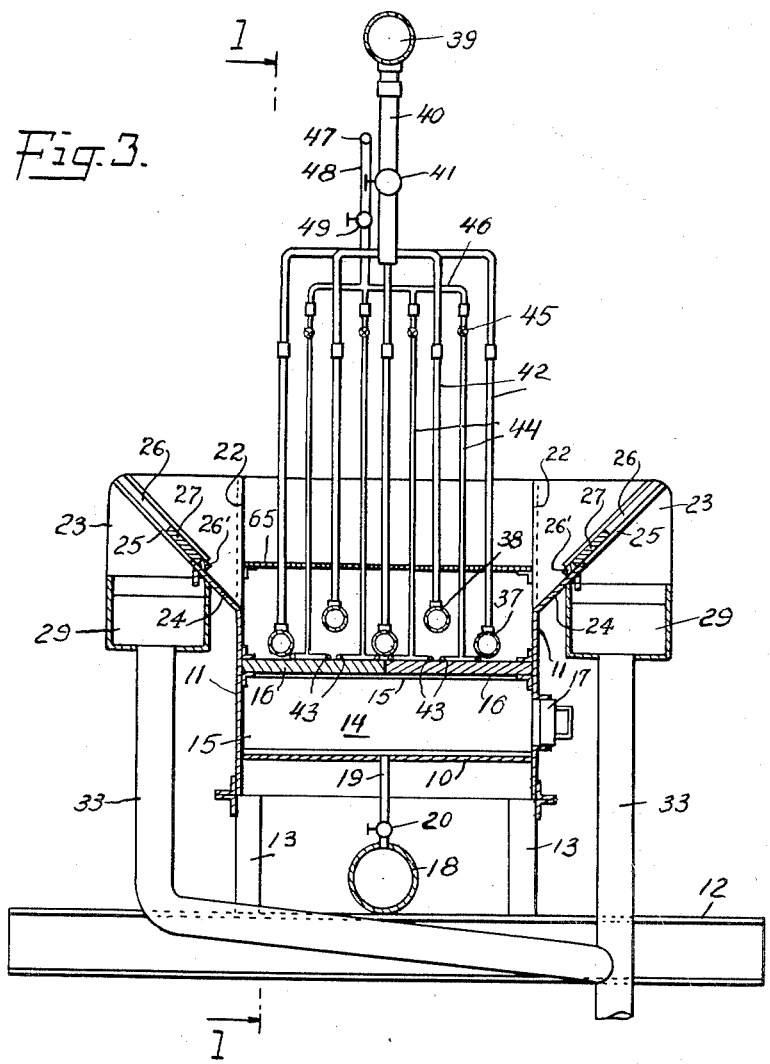

United States Patent Office 2,753,045
Patented July 3, 1956

2,753,045
CONCENTRATION OF MINERALS

Clinton A. Hollingsworth, Lakeland, Fla., assignor to Smith-Douglass Company, Incorporated, Norfolk, Va., a corporation of Virginia Application November 25, 1953, Serial No. 394,286

5 Claims. (Cl. 209—170)

This invention relates to the concentration of minerals by pneumatic flotation, and has for its object the provision of certain improvements therein and the provision of an improved flotation apparatus.

The invention is of particular advantage in the concentration of friable minerals, such as phosphate rock, which tend to become further disintegrated and to produce deleterious amounts of slime during the floation treatment, especially in machines of the agitation type. In the washing and concentration of phosphate rock, it is presently the common practice throughout the Florida phosphate field to double float phosphate. That is phosphate is first floated using a fatty acid (e. g. tall oil), fuel oil and caustic soda. The phosphate float (rougher concentrate) thus obtained usually contains 6 to 20% silica, commonly determined in the phosphate field as insoluble (insol). The phosphate float is deoiled by treatment with sulphuric acid, and residual acid is removed by rinsing with water. The deoiled and deacidified rougher concentrate is then fed to the so-called amine circuit where silica is floated away from the phosphate. In the phosphate field, it is customary to call the phosphate product "concentrate," regardless of whether it is the floated product or the underflow of the flotation apparatus, and hence the silica float is designated as "tailings."

The method aspect of the invention resides in certain improvements in the concentration of minerals by pneumatic flotation and involves aerating an aqueous pulp of the mineral while flowing through an aerating zone, and introducing water in a fine state of subdivision under the bottom of the flowing pulp while being aerated. The aerating zone is preferably in the form of an elongated, substantially horizontal and relatively shallow trough or channel having a porous bottom, and water is forced upwardly through the porous bottom into the flowing pulp. The flowing pulp is aerated by introducing air close to but above the porous bottom, and preferably at two or more different levels near the bottom of the flowing pulp with the lowest level of air introduction in close proximity to the porous bottom.

The flotation apparatus or cell of the invention is particularly adapted for practicing the aforementioned method improvements. It comprises an elongated trough having a porous bottom with a hydraulic compartment therebeneath. Preferably, the hydraulic compartment is in the form of a multiplicity of longitudinally disposed chambers, each independently supplied with the hydraulic medium (usually water) and covered by a porous element forming the aforementioned porous bottom. A plurality of gas (e. g. air) diffusers are positioned above and in close proximity to the porous bottom, preferably at two or more different levels as aforementioned. Froth overflow means are arranged near the top of at least one of the elongated sides of the trough, and preferably on both sides.

The foregoing and other novel features of the invention will be best understood from the following description taken in conjunction with the accompanying drawings, in which:

Fig. 1 is a longitudinal sectional elevation of a pneumatic flotation apparatus embodying the invention, taken on the section line 1—1 of Fig. 2, Fig. 2 is a top plan of the apparatus, Fig. 3 is a transverse sectional elevation taken on the section line 3—3 of Fig. 1, Figs. 4, 5 and 6 are detail explanatory sections taken on the section lines 4—4 of Fig. 1, 5—5 and 6—6 of Fig. 4, respectively, and Figs. 7 and 8 are detail explanatory views of the discharge end of the reagent supply pipe.

As previously mentioned, the invention is of special advantage in the flotation treatment of friable minerals like phosphate rock. In the heretofore customary practice in the Florida phosphate field, slimes are created in the course of the flotation treatment itself and adversely affect the efficiency of the treatment, particularly in the amine circuit, and hence slime removal prior to flotation is merely a palliative remedy. By the improvements of the invention slime creation during the flotation treatment is so minimized as to be practically unobjectionable, and a deslimed mineral pulp can be treated with high flotation efficiency. However, desliming may advantageously be conducted in the apparatus of the invention preceding the zone of aeration and mineral flotation, and the accompanying drawings illustrate an apparatus of this character. Where the mineral pulp is deslimed, preparatory to flotation, the desliming section of the apparatus illustrated in the drawings is omitted, and the zone of aeration and mineral flotation extends throughout the length of the apparatus.

Referring now to the accompanying drawings, the flotation apparatus or cell is in the form of a relatively shallow elongated trough or channel of rectangular section made up of a bottom 10 and sides 11 of metal or other suitable material. The trough is supported on the floor 12 by legs 13. The bottom 10 is slightly inclined with respect to the floor from the feed end to the discharge end, for example about 0.125 inch per foot.

The lower portion of the cell trough is divided into a multiplicity of compartments 14 by equally spaced transverse partitions 15. The compartments 14 are covered by a porous element 16 extending transversely and longitudinally over the entire width and length (respectively) of the cell, and constituting in effect the bottom of the cell proper. Each compartment 14 has a normally closed clean-out opening 17 in one of the cell sides 11. The bottom of each compartment 14 is connected to a longitudinal water header 18 (conveniently positioned on the floor 12) by a short pipe 19 having a control valve 20.

Each cell side 11 has at its top a multiplicity of longitudinally spaced rectangular openings 22 to provide overflow for froth, and herein referred to as the overflow lips. As best seen in Fig. 3 of the drawings, a vertically-positioned plate 23 extends outwardly from and is secured (e. g. welded) to each side of the opening 22. An upwardly and outwardly inclined short plate 24 bridges the lower part of the spaced plates 23 and is secured thereto (e. g. welded), thus forming a V-shaped pocket. Inwardly inclined filler-bar supports 25, each having a slot 26 generally aligned with the short plate 24, are secured to the opposed inner sides of the plates 23. The lower end of each slot 26 is closed by a block 26', and one or more filler-bars 27 are removably positioned in and between the slots 26, adjacent the block 26', for adjusting the height of the weir overflow and hence the pulp level in the cell.

Launders are suitably positioned beneath the lips 22 for appropriately collecting the overflow therefrom. In the cell illustrated in the drawings, three sets of such launders (28, 29 and 30) are shown. The launders 28 are positioned on opposite sides at the head or feed end of the cell and receive the overflow from the first four relatively closely-spaced lips 22. The spacing between the remaining lips is about twice that between the first four lips, and the first five of these relatively widely-spaced lips discharge into the intermediate launders 29, and the remaining two lips (at the discharge end of the cell) discharge into the launders 30. In the cell illustrated in the drawings, the launders 28 have independent discharge pipes 21 communicating with a common discharge pipe 31 for conveying slimes to a discharge line 32. Similarly, the independent discharge pipes 33 and 34 of the launders 29 and 30, respectively, communicate with a common discharge pipe 35, having a valve 36. Another discharge pipe 35' (having a valve 36') is shown connected to the pipe 35 whereby the combined overflow of the launders 29 and 30 may be conveyed to either or both of two discharge locations, as desired.

Air diffusers or aerators 37 and 38 are positioned in the cell immediately above the porous element 16. In the cell illustrated in the drawings, where the head or feed end of the cell is operated for desliming, the air diffusers are arranged throughout the remaining length of the cell, that is beyond the zone of desliming. Some, at least, of the air diffusers are positioned on or near the porous element. At least two levels of diffusers are preferred, and in the drawings the longitudinally extending lower air diffusers 37 are close to the porous element 16, and the longitudinally extending upper air diffusers 38 are positioned at a slightly higher level in the cell and intermediate the lower diffusers 37. The upper diffusers tend to disperse air bubbles rising from the lower diffusers thereby producing a finer dispersion of the air for flotation. Either or both levels of air diffusers may extend transversely of the cell rather than longitudinally, and very good results have been obtained with the lower diffusers 37 arranged transversely and the upper diffusers 38 arranged longitudinally so that the pulp in moving through the cell must pass over the transversely arranged diffusers thereby insuring good air contact. The longitudinal or lengthwise arrangement of the upper air diffusers 38 is of advantage since it tends to roll forth to the outer edges of the cell where it overflows into the lips 22. Compressed air from an overhead header 39 is conducted to the diffusers 37 and 38 through main pipes 40, each provided with a control valve 41, and distributor pipes 42, whereby the air admitted to each set of diffusers (i. e. lower and upper) throughout the length of the cell can be individually controlled.

The flotation reagent is introduced in close proximity to the upper surface of the porous element 16 just ahead of the aerated zone, or at one or more points along the aerated zone, through distributing nozzles 43. Each nozzle is connected by a vertical supply pipe 44, having a control valve 45, to a transverse header 46 which in turn is connected to an overhead reagent feeder 47 through a vertical pipe 48 having a control valve 49. Reagent is introduced at three spaced points along the length of the aerated zone of the cell (Fig. 1). At each point there are four transversely spaced nozzles 43 (Fig. 3). Each nozzle is longitudinally disposed to discharge reagent in the direction of pulp flow. In order to position the discharge ends of adjacent nozzles under an upper air diffuser 38, and hence promote prompt dissemination of reagent throughout the pulp, the nozzle is connected to its supply pipe 44 by a short transverse pipe 43' (Figs. 7 and 8). The transverse pipe 43' and nozzle 43 further provide a foot for resting the nozzle on top of the porous element 16.

Figs. 4, 5 and 6 of the drawings show the discharge end of the cell and the present preferred mounting of the porous element 16. The end wall 50 of the cell has a centrally positioned opening 51 for the discharge of pulp to a launder 52. A vertically adjustable discharge gate 53 covers the opening 51. Longitudinally extending brackets 54 are secured (e. g. welded) to the inner face of each cell side 11 for supporting the porous element 16, and the cell end 50 is provided with similar brackets for the same purpose. While the porous element 16 may consist of punched metal plate, metal screen, heavy canvas, punched metal plate covered with about 1 inch of lead shot, etc., it is now preferred to make the element of porous tile, satisfactory results having been obtained with "Aloxite" plates about 1 inch thick made by the Carborundum Company. The transverse partitions 15 have horizontal end flanges 15', the bottom flange being secured (e. g. welded) to the cell bottom 10 and the upper flange providing a support for the porous plates 16. In the cell illustrated in the drawings, the plates 16 are square (approximately 12" x 12"). At the sides of the cell, the plates 16 rest on the brackets 54 and are secured in position by an angle bar 55 bolted at 56 to the cell side 11 (Fig. 5). Longitudinally adjacent plates 16 straddle and rest on the upper flange 15' of the transverse partition 15, and the common corners of four plates are secured to the flange 15' by a washer-bolt 57 (Figs. 2 and 6).

At the head of the cell, the sides 11 are bridged by an outwardly inclined end wall 58 which in conjunction with a transverse baffle 59 forms the feed compartment 60 of the cell. As illustrated in the drawings (Figs. 1 and 2), practically dry feed is introduced into a conically-bottomed hopper 61 and is therein pulped to the desired density by circumferentially spaced water jets 62 of a circular water main 63 surrounding the conical bottom of the hopper. A valve 64 in the hopper discharge controls the rate of feed of pulp to the feed compartment 60.

In operating the apparatus illustrated in the accompanying drawings, feed from the hopper 61 is introduced into the desliming section of the cell where it encounters hydraulic water issuing upwardly from the porous plates 16. The hydraulic water enters the bottom of the body of mineral pulp in a very fine state of subdivision and induces a hydraulic classifying action in the course of which slime is carried to the surface and overflows into the launders 28.

No reagent is added and no air is introduced in the desliming section of the cell and the operation in this section is that of desliming by hydraulic classification. In those flotation processes where premixing of reagents with the mineral pulp is required, as well as in those cases where it is preferable to deslime in a separate piece of equipment, the desliming section of the cell may be utilized for flotation by extending the air diffusers (and reagent distributors where necessary) into the section. Where the entire cell is aerated for flotation treatment, the feed of mineral pulp thereto may be at the center instead of at one end, and pulp may be discharged at both ends of the cell.

In addition to inducing hydraulic classification, the hydraulic water introduced into the bottom of the pulp body flowing through the cell keeps the pulp in a fluid state and thereby insures efficient aeration. Without this fluidity the cell would tend to sand up and higher air pressures would be required for aeration. The increased fluidity imparted to the pulp by the hydraulic water also promotes the flow of the pulp through the cell somewhat in the nature of a water slide, and permits the treatment of a pulp of coarser mineral particles than has heretofore been practical. Accurate control of the amount of water entering the individual compartments or chambers 14 and thence introduced into the flowing pulp is effected by the valves 20.

The pulp is transported through the cell by the difference in head between the feed and discharge ends and the fluidity imparted thereto by the hydraulic water, aided somewhat by the slight inclination of the cell. After leaving the desliming section, the pulp enters the aerated zone where low pressure air from the header 39 is introduced into the flowing pulp through the diffusers 37 and 38 in close proximity to the porous bottom 16. A foraminous or perforated member 65, such as a screen or punched metal plate, may be provided above the diffusers 37 and 38, say at about the level of the overflow lips 22, to further diffuse the rising air bubbles and minimize boiling. Flotation reagents are introduced into the flowing pulp through the nozzles 43. In the aerated zone, a bubble column forms on top of the body of flowing pulp and properly coated mineral particles rise therethrough and overflow as a froth into the launders 29 and 30. For efficient operation, the body of ore pulp flowing through the cell should be relatively shallow, and the air diffusers should be placed in such a manner that not more than about 12 inches of pulp overlays the upper level diffusers. Where the cell depth is increased, an additional layer or layers of air diffusers should be provided to approximately maintain this relationship.

Among the advantages of the hydraulic-pneumatic flotation cell of the invention are (1) simple operation, (2) low reagent costs, (3) high grade of concentrate, (4) high recovery of mineral value and (5) low power consumption. The metallurgical advantages are principally due to the fact that the cell does not create or generate slime. Any slime present in the mineral pulp fed to the cell can be removed by providing a slimes removal section at the head or feed end of the cell. Low reagent cost results from the fact that slimes are not created in the cell and to more efficient aeration. The mechanical advantages of the cell are principally due to the marked fluidity of the flowing pulp resulting from the action of the hydraulic water introduced into the bottom thereof. The finely disseminated water issuing upwardly from the porous bottom also promotes transport of the pulp through the cell, and induces an upward current in the flowing pulp body that elevates mineral particles into the overlaying bubble column. This action of the hydraulic water in combination with the aerators positioned above but in close proximity to the porous bottom results in a highly efficient pneumatic flotation cell. In conventional pneumatic cells of the porous bottom type, transport of the pulp through the cell is difficult due to the tendency of the cell to sand up and for the pulp to become dense and almost solid. When hydraulic water is introduced into the bottom of the pulp, as in the invention, transport of the pulp is comparatively simple and aeration is more efficient due to the greater fluidity of the pulp.

The foregoing advantages of the invention are illustrated in the following example of an amine circuit flotation treatment of phosphate rock. The following is a typical screen analysis of the amine circuit feed:

Mesh: Percent weight
+20 _____ 4.6
−20+35 _____ 14.8
−35+65 _____ 35.8
−65+150 _____ 42.1
−150 _____ 2.7

The flotation reagent used was prepared by mixing approximately equal parts by weight of amine (Armoflote S) and diisobutyl carbinol (or methyl isobutyl carbinol). The following table gives the composite result of a two-weeks operation. The grade of the phosphate products is reported as percent of bone phosphate of lime (BPL, i. e. tricalcium phosphate), and silica is reported as percent of insol. For comparison, the table also gives the composite results of the conventional amine circuit flotation as presently commercially practiced for the same two-weeks period.

HYDRAULIC-PNEUMATIC CELL

| Feed | | Phosphate conc. | | Silica Tails, BPL | BPL recovery |
| --- | --- | --- | --- | --- | --- |
| BPL | Insol | BPL | Insol | | |
| 72.10 | 7.89 | 75.29 | 3.88 | 25.34 | 97.6 |
| PRESENT COMMERCIAL AMINE CIRCUIT | | | | | |
| 71.45 | 8.91 | 75.18 | 3.96 | 46.78 | 91.4 |

The reagent cost with the hydraulic-pneumatic cell was approximately 12 cents per ton of phosphate concentrate, while the current reagent cost in the amine circuit flotation is approximately 24 cents per ton of phosphate concentrate.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

I claim:

1. The improvement in the concentration of minerals by pneumatic flotation which comprises flowing an aqueous pulp of the mineral in a body of relatively shallow depth through an elongated and substantially horizontal trough having a porous bottom, forcing water upwardly through said porous bottom and into and over the entire area of the bottom of the flowing pulp, and introducing air into the flowing pulp close to but above said porous bottom.

2. The improvement in the concentration of minerals by pneumatic flotation which comprises flowing an aqueous pulp of the mineral through an elongated and substantially horizontal trough having a porous bottom, forcing water upwardly through said porous bottom and into the flowing pulp, introducing air and flotation reagent into part only of the flowing pulp close to but above said porous bottom, removing a slime overflow from the unaerated part of the flowing pulp, and removing a mineral froth concentrate from the aerated part of the flowing pulp.

3. The improvement in the concentration of minerals by pneumatic flotation which comprises flowing an aqueous pulp of the mineral in a body of relatively shallow depth through an elongated and substantially horizontal treatment zone having a porous bottom, forcing water upwardly through said porous bottom into the body of flowing pulp, introducing air into the bottom of only part of the body of flowing pulp at two different levels with the lowest level of air introduction in close proximity to said porous bottom, introducing a flotation agent into the bottom of only that part of the body of flowing pulp that is aerated as aforesaid, removing a slime overflow from the unaerated part of the flowing pulp, and removing a mineral froth concentrate from the aerated part of the flowing pulp.

4. A flotation apparatus comprising an elongated and relatively shallow trough having a porous bottom, feed means and tail discharge means positioned respectively at the opposite longitudinal ends of said trough, a hydraulic compartment beneath said porous bottom, both said porous bottom and said hydraulic compartment extending longitudinally and transversely over substantially the entire length and width respectively of said trough, means adapted to introduce a hydraulic medium into said compartment and to force the medium through said porous bottom into said trough, aerating means positioned above and in close proximity to said porous bottom, and froth overflow means arranged near the top of at least one of the elongated sides of said trough.

5. A flotation apparatus comprising an elongated and relatively shallow trough having a porous bottom, feed means and tail discharge means positioned respectively at the opposite longitudinal ends of said trough, a hydraulic compartment beneath said porous bottom, both said porous bottom and said hydraulic compartment extending longitudinally and transversely over substantially the entire length and width respectively of said trough, means adapted to introduce a hydraulic medium into said compartment and to force the medium through said porous bottom into said trough, a plurality of gas diffusers positioned at two different levels above and near said porous bottom with the lower diffusers in close proximity to the porous bottom, and froth overflow means arranged near the top of at least one of the elongated sides of the trough.

References Cited in the file of this patent

UNITED STATES PATENTS

| | | |
|---|---|---|
| 771,874 | Grant | Oct. 11, 1904 |
| 1,258,869 | Callow | Mar. 12, 1918 |
| 1,343,123 | Gahl et al. | June 8, 1920 |
| 1,375,211 | Cole | Apr. 19, 1921 |
| 1,798,452 | Butchart | Mar. 31, 1931 |
| 1,889,078 | Schiechel | Nov. 29, 1932 |
| 2,176,107 | Smith | Oct. 17, 1939 |
| 2,178,239 | McKenna | Oct. 31, 1939 |
| 2,420,180 | Laughlin | May 6, 1947 |